(12) United States Patent
Kumar

(10) Patent No.: US 7,329,080 B1
(45) Date of Patent: Feb. 12, 2008

(54) SPORTS EQUIPMENT TRANSPORTING APPARATUS

(76) Inventor: Tarun Kumar, 31 Ferris St., South River, NJ (US) 08882

( * ) Notice: Subject to any disclaimer, the term of this patent is extended or adjusted under 35 U.S.C. 154(b) by 143 days.

(21) Appl. No.: 11/208,930

(22) Filed: Aug. 23, 2005

(51) Int. Cl.
*B65G 67/02* (2006.01)

(52) U.S. Cl. .................................................. 414/537

(58) Field of Classification Search ............... 414/537, 414/529, 786, 539, 522; 296/61, 26.1; 14/69.5, 14/71.1
See application file for complete search history.

(56) References Cited

U.S. PATENT DOCUMENTS

| | | | | |
|---|---|---|---|---|
| 3,704,794 A | * | 12/1972 | Flamm | 414/537 |
| 3,870,170 A | * | 3/1975 | Noble et al. | 414/537 |
| 4,078,678 A | * | 3/1978 | Tordella | 414/537 |
| 4,601,632 A | * | 7/1986 | Agee | 414/537 |
| 5,331,701 A | * | 7/1994 | Chase et al. | 14/71.1 |
| 5,649,803 A | * | 7/1997 | Bennett | 414/537 |
| 5,795,125 A | * | 8/1998 | Walkden | 414/537 |

\* cited by examiner

*Primary Examiner*—Charles A Fox
(74) *Attorney, Agent, or Firm*—Mark Crossley; Crossley Patent Law

(57) ABSTRACT

A sports equipment transporting apparatus is described. The apparatus is designed to be put into a vehicle with a mid- to long-size body length and is housed within a ramp housing. The ramp housing is two-tiered and includes a slide-out ramp located within the upper tier, with the ramp being mounted on a pair of guide tracks. The lower tier includes a storage compartment and a spare tire compartment. The rear entry of the vehicle is modified so that the top door panel becomes a roll-out door panel, with two swinging doors attached that pivot outwards ninety degrees. When the ramp is fully extended from the ramp housing, the ramp angles downward and touches an external ground surface. Once a piece of sports equipment has been placed on top of the ramp housing, a series of tie-downs are utilized to keep the sports equipment in place.

6 Claims, 4 Drawing Sheets

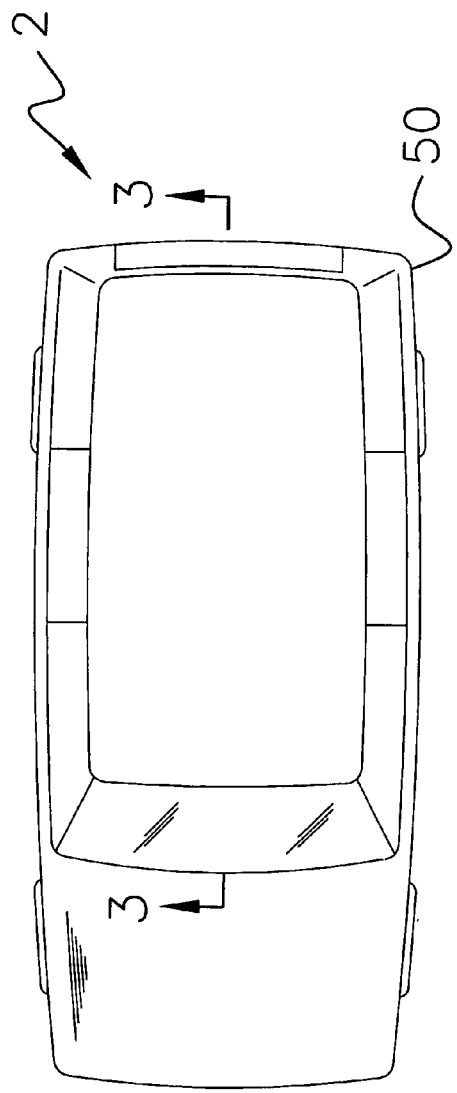
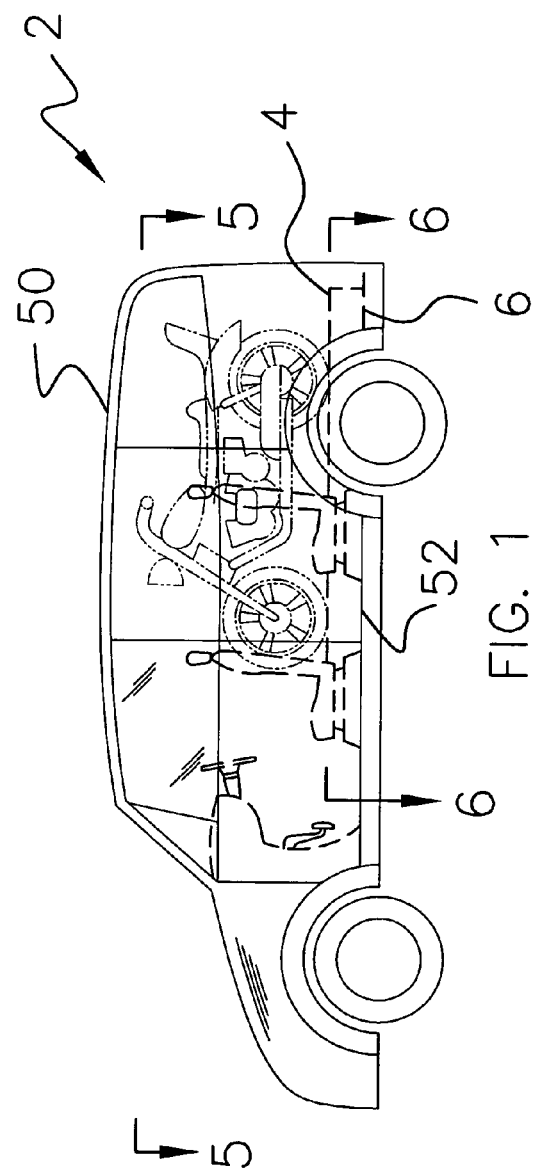
FIG. 2
FIG. 1

SPORTS EQUIPMENT TRANSPORTING APPARATUS

BACKGROUND OF THE INVENTION

The present invention concerns that of a new and improved sports equipment transporting apparatus.

DESCRIPTION OF THE PRIOR ART

U.S. Pat. No. 6,524,056, filed by Kloster, discloses an apparatus for easily loading and unloading a motorcycle or similar vehicle onto and from the bed of a utility vehicle.

U.S. Pat. No. 5,649,803, filed by Bennett, discloses a motorcycle ramp which is installed in a rear passenger compartment of a wheelchair converted van to allow a full-size motorcycle to be loaded into, transported within, and unloaded out of the van by a single person.

U.S. Pat. No. 5,331,701, filed by Chase et al., discloses a housing mounted to a vehicle floor that is arranged to permit removal and extension of an extension member therefrom.

United States Application No. 2002/0076312, filed by Schatzler et al., discloses a transport device for loading and unloading a trunk space of a motor vehicle.

U.S. Pat. No. 5,137,413, filed by Ressler, discloses an improvement in a vehicle for transporting wheelchair bound people or large and bulky items.

SUMMARY OF THE INVENTION

The present invention concerns that of a new and improved sports equipment transporting apparatus. The apparatus is designed to be put into a vehicle with a mid- to long-size body length and is housed within a ramp housing. Preferably, passenger side seats, both front and back seat, need to be removed so that the ramp housing can be properly placed within the vehicle. The ramp housing is two-tiered and includes a slide-out ramp located within the upper tier, with the ramp being mounted on a pair of guide tracks. The lower tier includes a storage compartment and a spare tire compartment. The rear entry of the vehicle is modified so that the top door panel becomes a roll-out door panel, while two swinging doors are attached and designed to pivot outwards ninety degrees. When the ramp is fully extended from the ramp housing, the ramp angles downward and touches an external ground surface. Once a piece of sports equipment has been placed on top of the ramp housing, a series of tie-downs can be utilized to keep the sports equipment in place.

There has thus been outlined, rather broadly, the more important features of a sports equipment transporting apparatus that the detailed description thereof that follows may be better understood and in order that the present contribution to the art may be better appreciated.

There are, of course, additional features of the sports equipment transporting apparatus that will be described hereinafter and which will form the subject matter of the claims appended hereto.

In this respect, before explaining at least one embodiment of the sports equipment transporting apparatus in detail, it is to be understood that the sports equipment transporting apparatus is not limited in its application to the details of construction and to the arrangements of the components set forth in the following description or illustrated in the drawings. The sports equipment transporting apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present sports equipment transporting apparatus. It is important, therefore, that the claims be regarded as including such equivalent constructions insofar as they do not depart from the spirit and scope of the present invention.

It is therefore an object of the present invention to provide a sports equipment transporting apparatus which has all of the advantages of the prior art and none of the disadvantages.

It is another object of the present invention to provide a sports equipment transporting apparatus which may be easily and efficiently manufactured and marketed.

It is another object of the present invention to provide a sports equipment transporting apparatus which is of durable and reliable construction.

It is yet another object of the present invention to provide a sports equipment transporting apparatus which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 1 shows a side view of a vehicle with the sports equipment transporting apparatus.

FIG. 2 shows a top view of a vehicle with the sports equipment transporting apparatus.

DESCRIPTION OF THE PREFERRED EMBODIMENT

Figure 3:
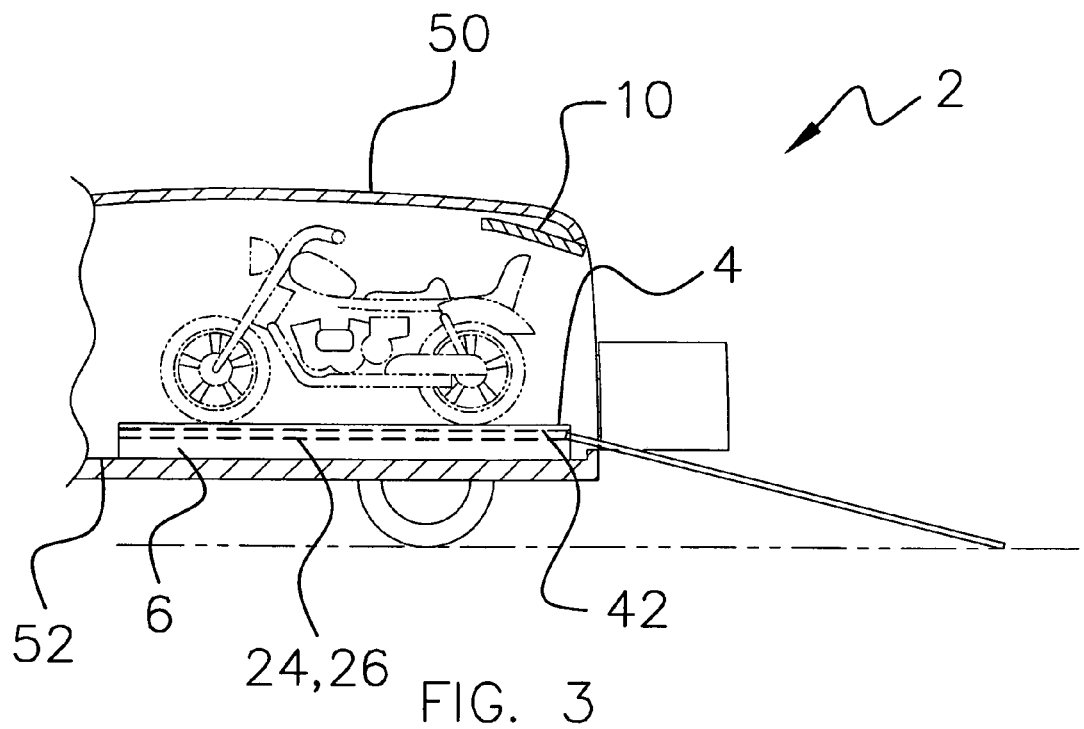
FIG. 3 shows a side view of a vehicle with the sports equipment transporting apparatus showing the ramp as it would appear extended out of the ramp housing.
Figure 4:
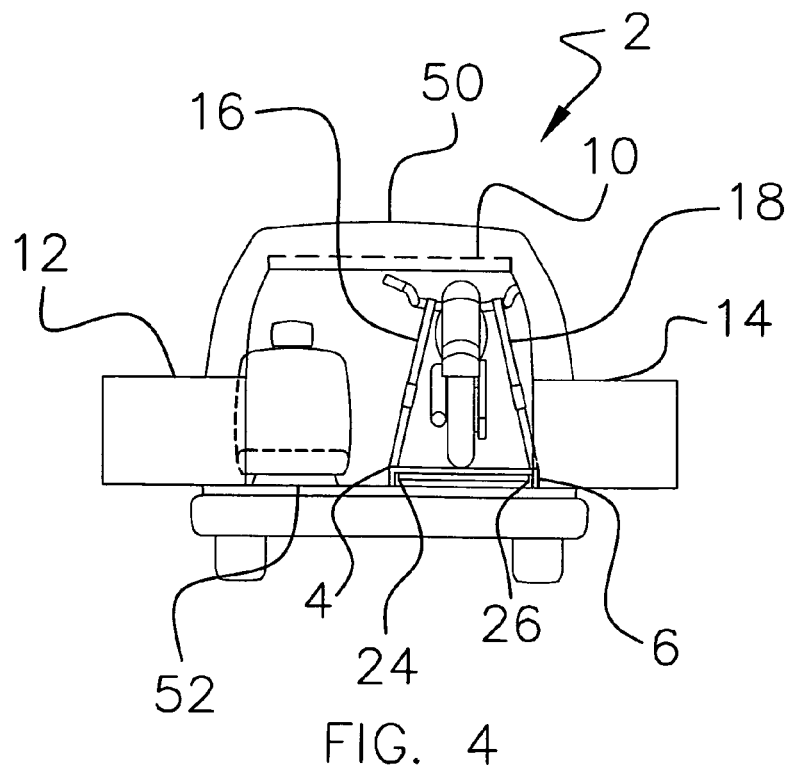
FIG. 4 shows a rear view of a vehicle with the sports equipment transporting apparatus having the ramp retracted, the pair of swing doors open, and a piece of sports equipment mounted on the top of the ramp housing with a pair of tie downs.
Figure 5:
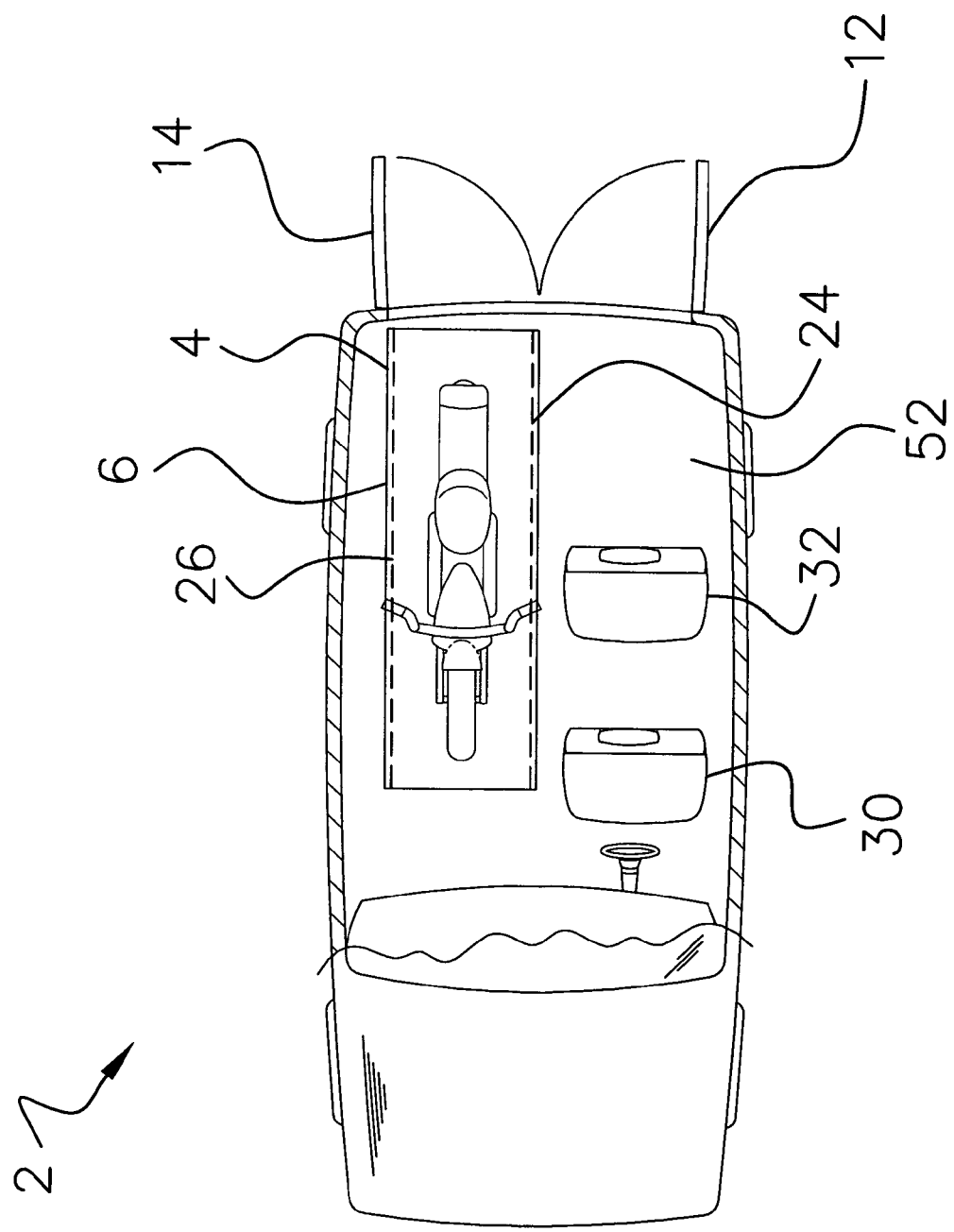
FIG. 5 shows a top view of a vehicle with the sports equipment transporting apparatus as it would appear with a piece of sports equipment mounted on the top of the ramp housing.
Figure 6:
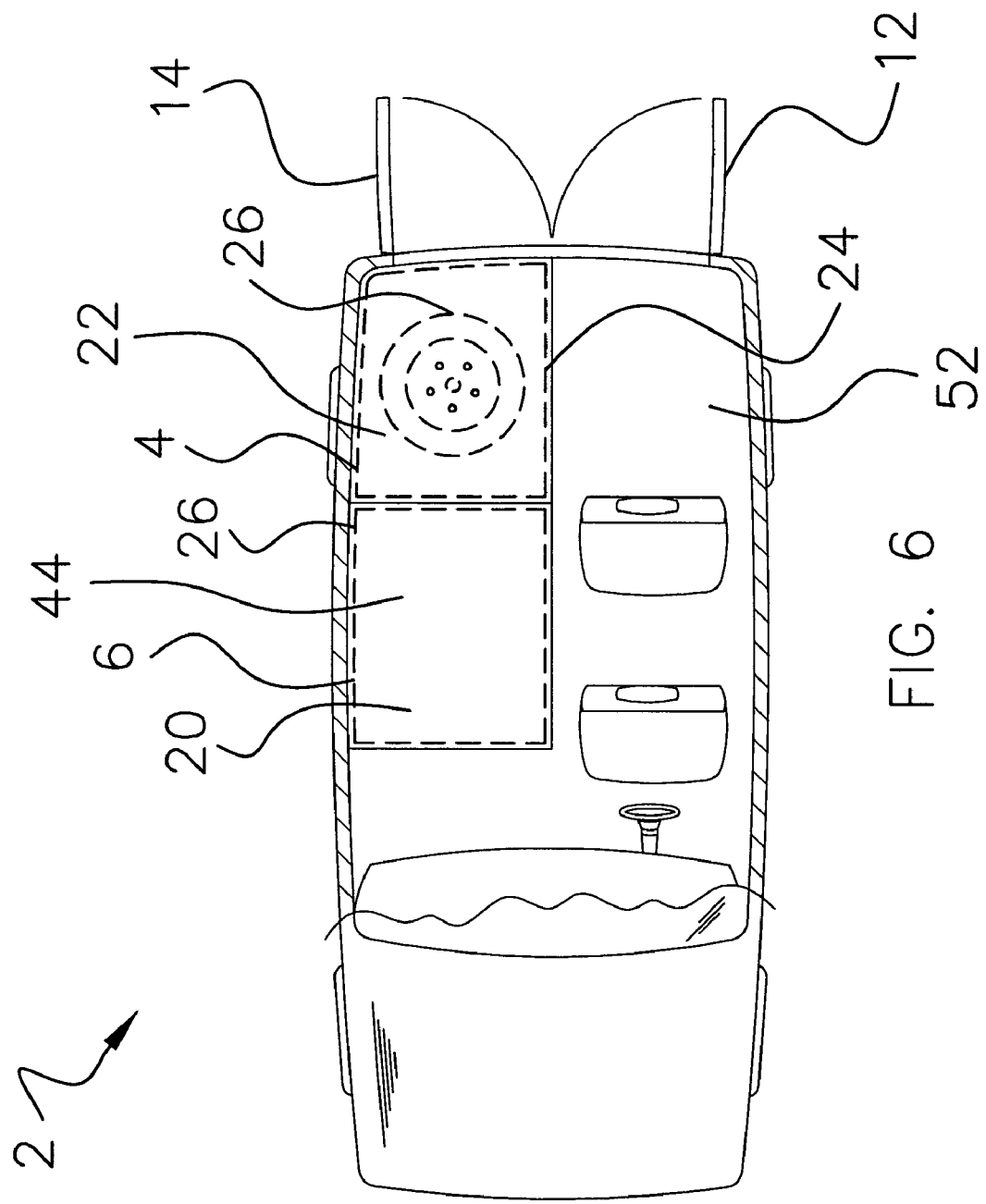
FIG. 6 shows a top view of a vehicle with the sports equipment transporting apparatus as it would appear highlighting the storage compartment and the spare tire compartment within the ramp housing.

With reference now to the drawings, and in particular to FIGS. 1 through 6 thereof, a new sports equipment transporting apparatus embodying the principles and concepts of the present invention and generally designated by the reference numeral 4 will be described.

As best illustrated in FIGS. 1 through 6, the sports equipment transporting apparatus 4 is designed to be put into a vehicle 2 with a mid- to long-size body length. The vehicle 2 preferably has an enclosed canopy 50, and therefore, most likely would either be a mini-van or a sport utility vehicle.

The vehicle also includes an internal floor 52 and has two ends, a front end and a rear end.

The apparatus 4 comprises a ramp housing 6, which has two ends, a front end and a rear end, and furthermore, has two sides, an inner side and an outer side. The ramp housing 6 is mounted on the internal floor 52 within the vehicle 2. The ramp housing 6 is rectangular and has a length and a width, with the length running from the front end to the rear end of the ramp housing 6. The length of the ramp housing 6, in order to accommodate a piece of sports equipment 40, must be at least four to five feet long, if not longer. The inner side of the ramp housing 6 is the side that faces the inside of the vehicle, while the outer side of the ramp housing 6 is the side that faces an interior wall of the vehicle 6.

The passenger side seats would have to be removed prior to installation of the ramp housing 6. Depending on the vehicle, this would be either two or three seats (because some minivans and sport utility vehicles have three rows of seats).

The ramp housing 6 is two-tiered and includes a slide-out ramp 8 located within the upper tier 42, with the ramp 8 being mounted on a pair of guide tracks 24 and 26 located within the ramp housing 6. When an individual wants to pull the ramp 8 out of the rear end of the ramp housing 6, he or she can fully extend the ramp and place one edge against an external ground surface, with the other end of the ramp 8 remaining connected to the guide tracks 24 and 26 within the ramp housing 6. In this position, the ramp 8 angles downward and touches an external ground surface. This positioning of the ramp 8 will allow a piece of sports equipment 40 to be rolled, wheeled, etc., up the ramp 8 onto the top of the ramp housing 6.

The rear end of the vehicle is modified to include a roll-out door panel 10 that is top-mounted where the rear window would normally be located. The door panel 10 can be rolled up or pulled down as needed. Furthermore, a pair of swinging doors 12 and 14 are attached to the rear end of the vehicle and designed to open outward as they open, leaving a wide open space for a piece of sports equipment 40 to be placed within the vehicle 2.

The lower tier 44 of the ramp housing 6 includes both a storage compartment 20 and a spare tire compartment 22.

These two compartments 20 and 22 are preferably accessed from the inner side of the ramp housing, as the outer side of the ramp housing faces quite close to an interior wall within the vehicle 6. A spare tire 23 can be placed within the spare tire compartment 22, while miscellaneous items can be stored in the storage compartment 20 as needed.

Once a piece of sports equipment 40 has been placed on top of the ramp housing 6, a series of tie-downs 16 and 18 can be utilized to keep the sports equipment 40 in place. The tie-downs are attached to the piece of sports equipment 40 and are also attached to the ramp housing 6 in an effort to secure the sports equipment 40 in a pretty fixed position. Although two tie-downs 16 and 18 are shown in the figures with this application, more or less tie-downs can be utilized as needed.

The piece of sports equipment 40 in the drawings is shown to be a motorcycle. However, the piece of sports equipment 40 could be used, such as moped, all-terrain-vehicle, or other such items.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sports equipment transporting apparatus in combination with a vehicle, the vehicle including an enclosed canopy, the vehicle also including an internal floor, the vehicle including two ends, a front end and a rear end, the sports equipment transporting apparatus comprising:
    (a) a ramp housing having two ends, a front end and a rear end, the ramp housing also having two sides, an inner side and an outer side, the ramp housing being rectangular in shape, the ramp housing having a length and a width, the length dimension of the ramp housing running from the front end to the rear end of the ramp housing, the ramp housing including two internal tiers including an upper tier and a lower tier, the ramp housing being mounted on the internal floor within the vehicle,
    (b) a slide-out ramp located within the upper tier of the ramp housing,
    (c) means for mounting the slide-out ramp when it is located within the upper tier of the ramp housing,
    (d) a storage compartment located within the lower tier of the ramp housing, the storage compartment being accessible through the inner side of the ramp housing,
    (e) a spare tire compartment located within the lower tier of the ramp housing, the spare tire compartment being accessible through the inner side of the ramp housing,
    (f) at least one spare tire located within the spare tire compartment,
    (g) a piece of sports equipment, wherein the piece of sports equipment further comprises a motorcycle,
    (h) means for tying down the piece of sports equipment after it has been placed on the ramp housing,
    (i) wherein the slide-out ramp is pulled out from the rear end of the ramp housing and placed on a ground surface,
    (j) further wherein the piece of sports equipment is moved up the ramp until it is in position to be placed on top of the ramp housing,
    (k) further wherein means for tying down the piece of sports equipment after it has been placed on the ramp housing is activated to secure the piece of sports equipment to the ramp housing.

2. A sports equipment transporting apparatus according to claim 1 wherein the means for mounting the slide-out ramp when it is located within the upper tier of the ramp housing further comprises a pair of guide tracks, the pair of guide tracks being located within the ramp housing.

3. A sports equipment transporting apparatus according to claim 2 wherein the means for tying down the piece of sports equipment after it has been placed on the ramp housing further comprises at least a pair of tie-downs, the tie-downs being used to attach the piece of sports equipment to the ramp housing.

4. A sports equipment transporting apparatus according to claim 3 wherein the vehicle further comprises a roll-out door panel attached to the rear end of the vehicle.

5. A sports equipment transporting apparatus according to claim 4 wherein the vehicle further comprises a pair of swinging doors attached to the rear end of the vehicle, the swinging doors designed to swing outward as each of the doors opens.

6. A sports equipment transporting apparatus according to claim 5 wherein the ramp housing has a length of at least four to five feet.

* * * * *